United States Patent
Linyear et al.

(10) Patent No.: US 7,033,098 B2
(45) Date of Patent: Apr. 25, 2006

(54) KEYBOARD COVER AND COPY HOLDER

(76) Inventors: Jessie B. Linyear, 700 Harbor Quay, Chesapeake, VA (US) 23320; Richard A. Linyear, 700 Harbor Quay, Chesapeake, VA (US) 23320

( * ) Notice: Subject to any disclaimer, the term of this patent is extended or adjusted under 35 U.S.C. 154(b) by 0 days.

(21) Appl. No.: 09/918,071

(22) Filed: Jul. 30, 2001

(65) Prior Publication Data

US 2003/0021622 A1    Jan. 30, 2003

(51) Int. Cl.
*B41J 11/62* (2006.01)

(52) U.S. Cl. ........................... 400/718; 400/714

(58) Field of Classification Search ............ 248/227.2, 248/441.2, 442.2, 447, 452, 457; 400/713, 400/714, 715, 718, 691, 693; 235/1 D, 149 R; 245/145 R
See application file for complete search history.

(56) References Cited

U.S. PATENT DOCUMENTS

| | | | | |
|---|---|---|---|---|
| 4,449,763 A | * | 5/1984 | Barnett | 312/208 |
| 4,758,712 A | * | 7/1988 | Matone, Jr. et al. | 235/145 R |
| 4,893,775 A | * | 1/1990 | Long | 248/442.2 |
| 5,104,086 A | * | 4/1992 | Ramey, III. et al. | 248/442.2 |
| 5,383,643 A | * | 1/1995 | Koch | 248/447 |
| 5,450,950 A | * | 9/1995 | Randolph et al. | 206/232 |
| 5,452,876 A | * | 9/1995 | Hatcher | 248/441.1 |
| 5,568,358 A | * | 10/1996 | Nelson et al. | 361/681 |
| 6,042,075 A | * | 3/2000 | Burch, Jr. | 248/442.2 |

\* cited by examiner

*Primary Examiner*—Manish S. Shah
(74) *Attorney, Agent, or Firm*—David J. Bolduc

(57) ABSTRACT

A keyboard cover and copy holder is presented. The keyboard cover and copy holder has a top plate member having downward extending left and right side panels and a bottom plate member having upward extending left and right side panels. Each upward extending left and right side panel of the bottom plate member is pivotably engaged with each respective downward extending left and right side panel of the top plate member.

6 Claims, 4 Drawing Sheets

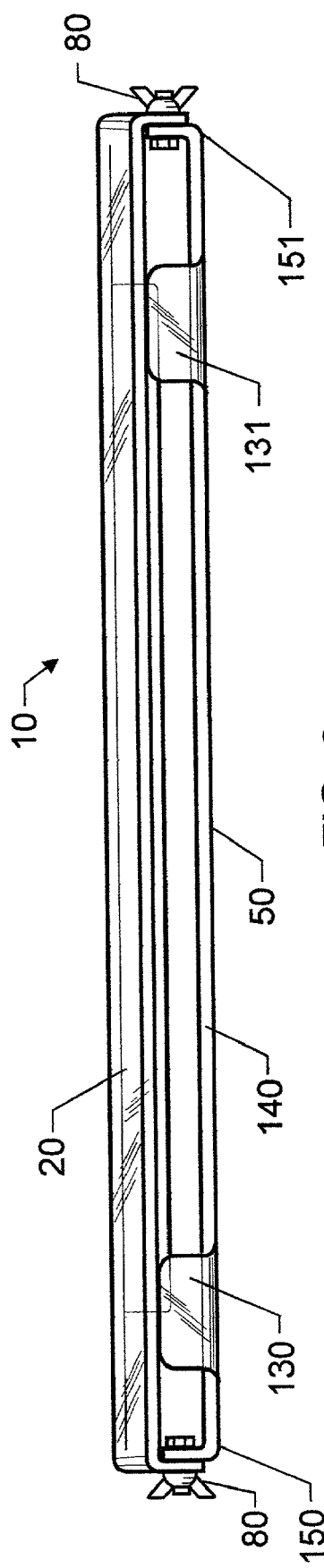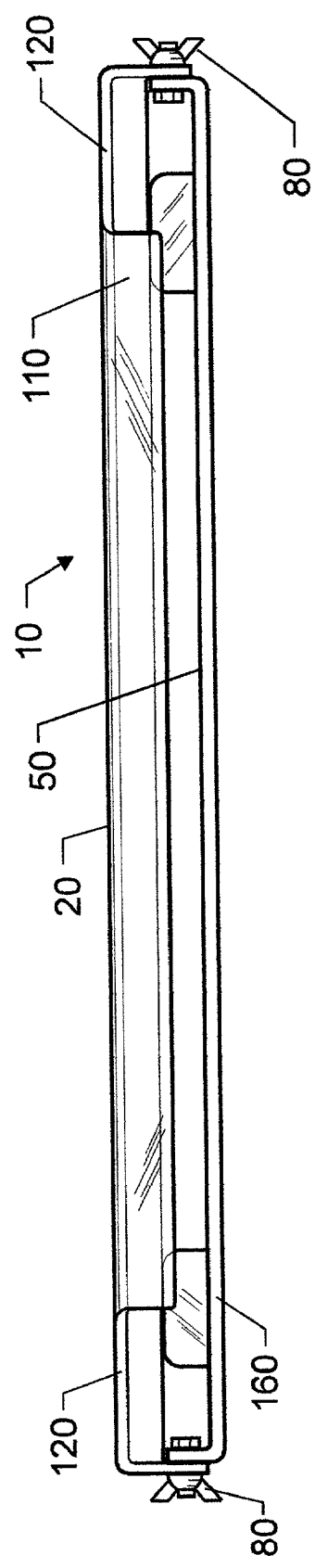

KEYBOARD COVER AND COPY HOLDER

BACKGROUND OF THE INVENTION

1. Field of the Invention

The present invention relates to an apparatus for covering a keyboard and holding copy, and more particularly to a device with components which pivot between one position in which it serves as a copy holder and another position in which it serves as a keyboard cover adapted for use either on top of a desk or on a pull-out shelf.

2. Description of the Prior Art

It is desirable to hold a document or a book in position between a keyboard and a monitor so that the copy is in direct line of sight in front of and close to the operator. It is also desirable to protect the keyboard from dust particles, dirt, and debris when the computer is not in use.

The prior art includes a wide variety of keyboard covers for covering a computer keyboard when it is not in use. It also includes a wide variety of copy holders which support copy so that an operator may view it and enter its contents into a computer. Finally, the prior art includes devices which serve as both keyboard covers and copy holders.

The prior devices identified above suffer a host of disadvantages. First, having a separate cover and copy holder requires storage of one device during use of the other. Separate devices also increase the number of accessories and typically, their cost. The prior devices which serve as both a keyboard cover and copy holder usually include complex attachments and are so large and bulky that the user's view of the computer screen may be obscured.

The apparatus of the present invention avoids the disadvantages of the prior devices and effectively functions as a keyboard cover and a copy holder. It is a simple construction that minimizes the cost of manufacture and assembly and provides reliable and effective performance. It width allows keyboards of different sizes to be used. Lastly, its size allows either placement on the pull-out shelf of a computer desk when in use, storage on the shelf under the desk when not in use, or placement on top of the desk.

U.S. Pat. No. 6,010,262 t Linyear discloses a keyboard shield and copy holder. A top plate member is adjustably affixed to a lower plate member suitable for containing a keyboard therebetween and holding copy on top of the top plate. The adjustability of the top plate member with respect to the bottom plate member lies in the ability of fasteners in the top plate to slide along an angled slot in the bottom plate.

U.S. Pat. No. 4,449,763 to Barnet discloses a protective cover for keyboard machines. A transparent hood is affixable to the machine housing and open at one side to admit the operator's hand. A panel is provided that is generally parallel to the keyboard face and spaced apart therefrom by a distance sufficient to allow normal hand and finger movements by the operator, but too close to permit any appreciable whole-hand movements. Such a device would not be suitable for one who is using a keyboard because whole hand movement is required.

U.S. Pat. No. 5,383,643 to Koch describes a keyboard cover and copy holder that has a first plate member and an adjacent second plate member pivotally connected to the first plate member. Each plate member has a rectangular main plate segment and a flange segment which extends perpendicularly to the segment and around three sides of the plate segment. The second plate member may be positioned in a first position in which it and the first plate member are adjacent each other in a flat configuration, thus serving as a keyboard cover. Alternatively, the second plate member may be positioned in a second position in which it and the first plate member lie at an acute angle. In this instance, the device serves as a copy holder with the second plate member on the left or right side of the keyboard (as viewed by the keyboard user). This device is inadequate for holding large documents or books and may shield the screen when holding copy. There is no disclosure that the device can be stored on a keyboard shelf under a computer desk.

U.S. Pat. No. 4,758,712 to Matone, Jr. et al. discloses a protective enclosure assembly for the keyboard. This enclosure consists of an upper section with an opening which forms a viewing window, a lower section which holds the keyboard, and sidewalls extending from the upper section to the lower section. A transparent, flexible membrane which conforms to the size and shape of the keyboard it houses is positioned in the opening of the top section, permitting an operator to view and press the keys. This device serves only as a keyboard cover.

U.S. Pat. No. 4,893,775 to Long describes a copy holder stand, in use, disposed between the computer keyboard and the monitor. The copy holder stand is equipped with a forwardly inclinable copy holder back. The copy holder stand includes a base which is disposed beneath a computer, with an upwardly extending support member. A movable copy holder back is attached by means of a hinge to the support member and is pivotable between the copy holder position and a lowered position. This device must rest against the monitor or the computer when in the copy holder position and it is too bulky to store the keyboard on the pull-out shelf under the computer desk.

U.S. Pat. No. 5,104,086 to Ramey, III, et al. includes a planar base plate with an upstanding easel connected to the forward end of the base plate. The easel has a projecting lip which supports copy for viewing. The easel is adjustably connected to the support member to permit both lateral slidable movement and vertical movement with respect to the base plate. Such a device does not allow for storage under a computer desk.

U.S. Pat. No. 5,452,876 to Hatcher discloses a copy holder tray positioned within a housing and mounted by means of fasteners attached to a rear edge portion of the tray. A rear edge portion of the copy holder tray is attached to fasteners mounted in elongate slots in the side walls of the housing. This allows movement of the copy holder tray between a first position within the housing for storage of copy and a second position wherein the copy holder tray extends forward from the housing to display copy. The slots are elevated above a desktop so the tray is inclined to the desktop at a comfortable predetermined angle. Such a device would not be suitable for a small desk area because of space needed to achieve the angle for the copy holder. In addition, the monitor has to be elevated in order to achieve a comfortable angle for viewing.

U.S. Pat. No. 6,042,075 to Burch, Jr. is a computer copy holder adapted for use with a keyboard drawer at a computer work station. It includes a base plate on which a keyboard is placed and which forms an inclined support ridge above the keyboard against which a copy support plate rests. It includes an inclined copy rest to support copy material. The device fits inside the keyboard drawer together with the keyboard in front of the computer monitor. Although the device can be stored in the drawer with the keyboard, the copy holder is limited to one predetermined position and the copy support plate must be removed and repositioned for storage in the drawer.

An object of the present invention is to provide a copy holder to hold documents in a convenient inline manner between the user, the computer keyboard and the computer monitor.

It is a further object of the present invention is to provide a convenient and inexpensive means to protect the keyboard.

It is a further object of the current invention to provide a document holder which will hold single sheets or opened tablets in place without the need for clips, springs or other devices to hold a document.

It is a further object of the current invention to provide a copy holder that increases the effective work surface by having the capacity to store the copy holder along with the keyboard on a pull-out shelf under the desk.

It is a further object of the current invention to provide a simple keyboard cover and copy holder combination device which can be easily removed for storage when not in use.

Another object of the present invention is to provide a copy holder which can be used either on top of the desk or on the pull-out shelf.

SUMMARY OF THE INVENTION

The foregoing objects are achieved by the present invention. The keyboard cover and copy holder apparatus includes a top plate member having downward extending left and right side panels and a bottom plate member having upward extending left and right side panels. Each upward extending left and right side panel of the bottom plate member is pivotably engaged with each respective downward extending left and right side panel of the top plate member. This design allows the apparatus to pivot between a keyboard cover position in which the top plate member and the bottom plate member have a substantially flat configuration and a copy holder position in which the top plate member and the bottom plate member lie at an angle with respect to each other, which position and angle are suitable for the insertion and retention for viewing of copy material.

Additional objects and advantages of the invention will be set forth in part in the description which follows, and in part will be obvious from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawings illustrate a complete embodiment of the invention according to the best modes so far devised for the practical application of the principles thereof, and in which:

FIG. 6 is a front elevation view of the invention in a closed position.

FIG. 7 is a back elevation view of the invention in a closed position.

DESCRIPTION OF THE PREFERRED EMBODIMENTS

Figure 1:
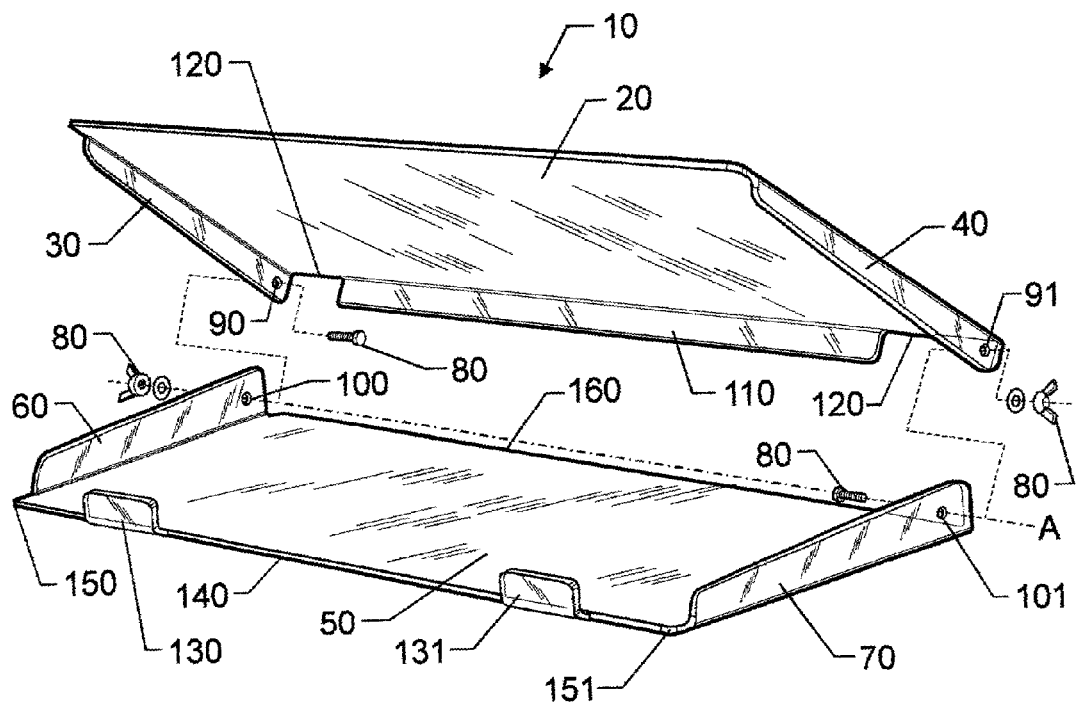
FIG. 1 is a perspective view of an embodiment of the invention when it is disassembled. The operable relationship of the fastener with respect to the downward extending and upward extending left and right side panels is also shown.

Referring now to the figures where similar parts are numbered the same throughout. FIG. 1 is a perspective view of a preferred embodiment of the invention when it is disassembled. In this embodiment, the keyboard cover and copy holder 10 comprise a top plate member 20 having downward extending left 30 and right 40 side panels and a bottom plate member 50 having upward extending left 60 and right 70 side panels. Each upward extending left 60 and right 70 side panel of the bottom plate member 50 is adjustably engaged with each respective downward extending left 30 and right 40 side panel of the top plate member 20. The top plate member 20 and the bottom plate member 50 are comprised of any rigid material known to those skilled in the art, provided it is not cardboard. Preferably the material is a polymeric material such as plastic.

Figure 2:
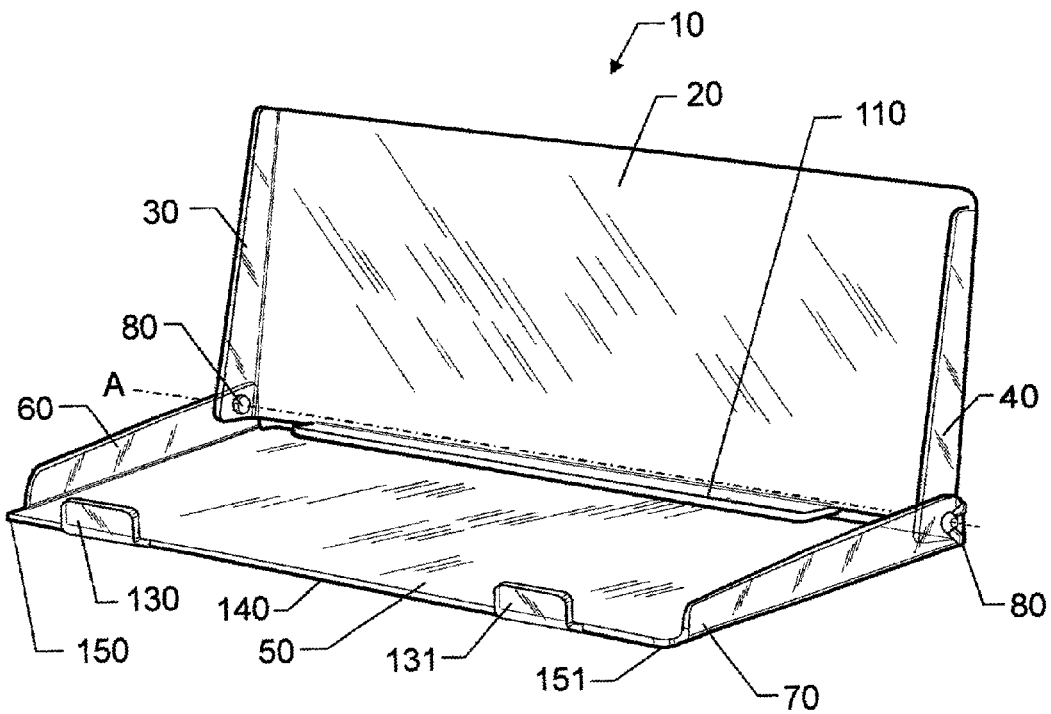
FIG. 2 is a perspective view of one embodiment of the invention when it is assembled in the copy holder position.

Referring no to FIGS. 1 and 2: The adjustable engagement of the top plate member 20 and bottom plate member 50 is such that the downward extending left 30 and right 40 side panels of the upper plate member 20 are interior to the upward extending left 60 and right 70 side panels of the bottom plate member 50. Alternately, the adjustable engagement of the top plate member 20 and bottom plate member 50 may be such that the downward extending left 30 and right 40 side panels of the upper plate member 20 are exterior to the upward extending left 60 and right 70 side panels of the bottom plate member 50. More preferably, the adjustable engagement of the top plate member 20 and bottom plate member 50 is such that the top plate member 20 is pivotably engaged with the bottom plate member 50 about a pivot axis A in proximity to and substantially parallel to the rear edges 120 and 160 of the top plate member 20 and bottom plate member 50 respectively.

The side panels are preferably pivotably secured to each other along the pivot axis A. The pivot axis A is in proximity to and substantially parallel to the back edges 120 and 160 of the top plate member 20 and bottom plate member 50 respectively, and most preferably one quarter inch to two inches from the rear edges 120 and 160 of the keyboard cover and copy holder 10. Any means known to those skilled in the art may be used to pivotably engage the upper side panels 30 and 40 to the lower side panels 60 and 70. Preferably the upper side panels 30 and 40 are pivotably secured to the lower side panels 60 and 70 using fasteners 80 extending through bores 90–91 and 100–101 therein.

FIG. 1 shows an embodiment wherein each downward extending left 30 and right 40 side panel has at least one bore 90 and 91 respectively extending therethrough. Also each upward extending left 60 and right 70 side panel has at least one bore 100 and 101 respectively extending therethrough. Each bore 90 and 91, and 100 and 101 is located along the pivot axis A in proximity to the rear edge 120 and 160 of the respective top and bottom plate members 20 and 50. Each bore is also preferably vertically located substantially midway along the upward or downward extending left or right side panel. Thus the downward extending left side panel 30 has a bore 90 therethrough and the downward extending right side panel 40 has a bore 91 therethrough, which bores 90 and 91 are located in proximity to the rear edge 120 of the upper plate member 20 along a pivot axis A. Likewise, the upward extending left side panel 60 has a bore 100 therethrough and the upward extending right side panel 70 has a bore 101 therethrough, which bores 100 and 101 are located in proximity to the rear edge 160 of the bottom plate member 50 along a pivot axis A.

FIG. 1 also shows fasteners 80 positioned in an operable relationship to the bores 90 and 91 on the top plate member 20 and the bores 100 and 101 on the bottom plate member 50. Any fastener known to those skilled in the art may be used to pivotably secure the top plate member 20 to the bottom plate member 50 and FIG. 1 depicts a preferred embodiment wherein the fastener 80 is a wing nut, washer and bolt. Other fasteners 80 known to those skilled in the art may be used including but not limited to: a screw; a wing nut; a snap lock; a bolt; a rivet, a hook; a post; a clip; a plug; an anchor; a peg; a binder; a catch; a clamp; a clasp; a dowel; a pin; a tongue and groove; and a cleat. Alternatively, the top plate member 20 and bottom plate member 50 may be molded such that they mechanically and pivotably interlock at the respective bores such that a fastener is not necessary. The operable relationship is defined such that a fasteners 80 passes through the bores 90 and 100, and 91 and 101 to pivotably secure the top plate member 20 to the bottom plate member 50 such that the top plate member will pivot in relation to the bottom plate member about the pivot axis A. More specifically, a fastener 80 is passed through bores 90 and 100 to pivotably secure the downward extending left side panel 30 to the upward extending left side panel 60. Likewise, a second fastener 80 is passed through bores 91 and 101 to pivotably secure the downward extending right side panel 40 to the upward extending right side panel 70.

The top plate member has one flange 110 curving downward from the back edge 120 of the top plate member 20. This flange 110 may be as small as one-inch in length or may run the entire length back edge 120 of the top plate member 20. The flange functions to support the copy and to keep it from sliding off of the top plate member 20. When no flange is present, another means of securing the copy in place must be used. However, if the keyboard cover and copy holder 10 is only to be used to cover the keyboard, then nothing is needed to hold copy.

In addition to the top plate member 20 having a flange 110, the bottom plate member 50 has a pair of flanges 130 and 131 extending upward from a front edge 140 of the bottom member 50. Preferably, each flange 130 and 131 is positioned in proximity to the corners 150 and 151 respectively of the front edge 140 of the bottom plate member 50. Preferably each flange 130 and 131 is positioned approximately two inches from the corners 150 and 151 respectively. Although a pair of flanges are shown, a single flange 130 may be used. If a single flange 130 is used, it should be centered near the front edge 140 of the bottom plate member 50. The pair of flanges 130 and 131 are not a necessary element of the invention, in the preferred embodiment they are present to prevent the keyboard from sliding or moving forward off of the bottom plate member 50. In use, the keyboard is placed on top of the bottom plate member 50 such that is comes forward and rests against the flanges 130 and 131.

FIG. 2 depicts the keyboard cover and copy holder 10 assembled in an open position. This position facilitates the reading of copy material. When assembling the keyboard cover and copy holder 10 each bore 90 and 91 in each downward extending left 30 and right 40 panel is aligned with each bore 100 and 101 in each upward extending left 60 and right 70 side panel respectively. Fasteners 80 are positioned in an operable relationship to each bore 90 and 100, and 91 and 101. The operable relationship is defined such that the fastener 80 passes through the bores 90 and 100, and 91 and 101 and pivotably secures the top plate member 20 to the bottom plate member 50 at a pivot axis A.

Figure 3:
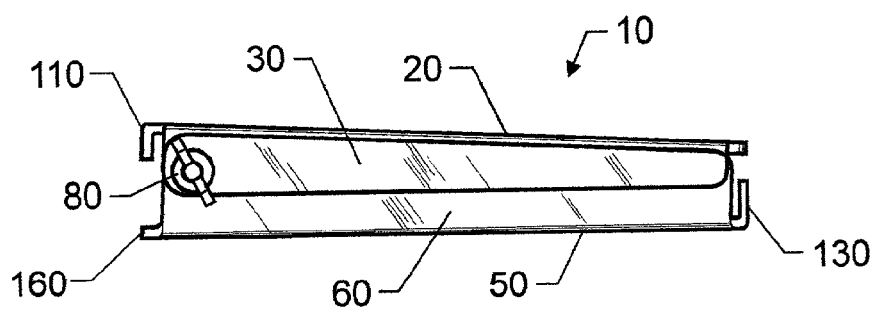
FIG. 3 is an elevation view showing one side of the invention in a closed position.
Figure 4:
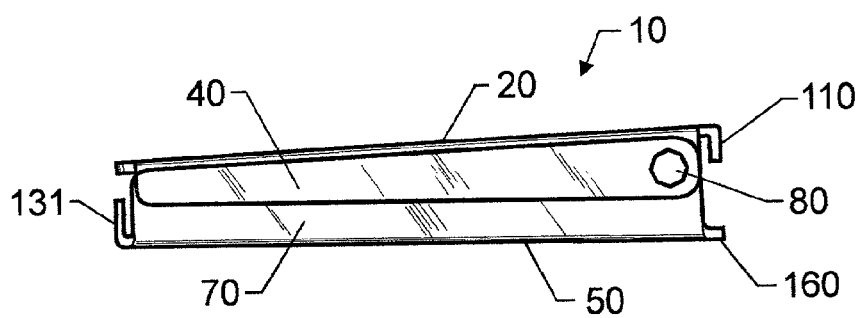
FIG. 4 is an elevation view showing the opposite side of the invention shown in FIG. 3 in a closed position.

FIG. 3 and FIG. 4 show side views of the keyboard cover copy holder 10 in a closed position. The top plate member 20 is substantially parallel, i.e., approximately at a zero degree angle with respect to the bottom plate member 50. In this position the top plate member 20 covers the keyboard and the keyboard is protected from dust and dirt.

Figure 5:
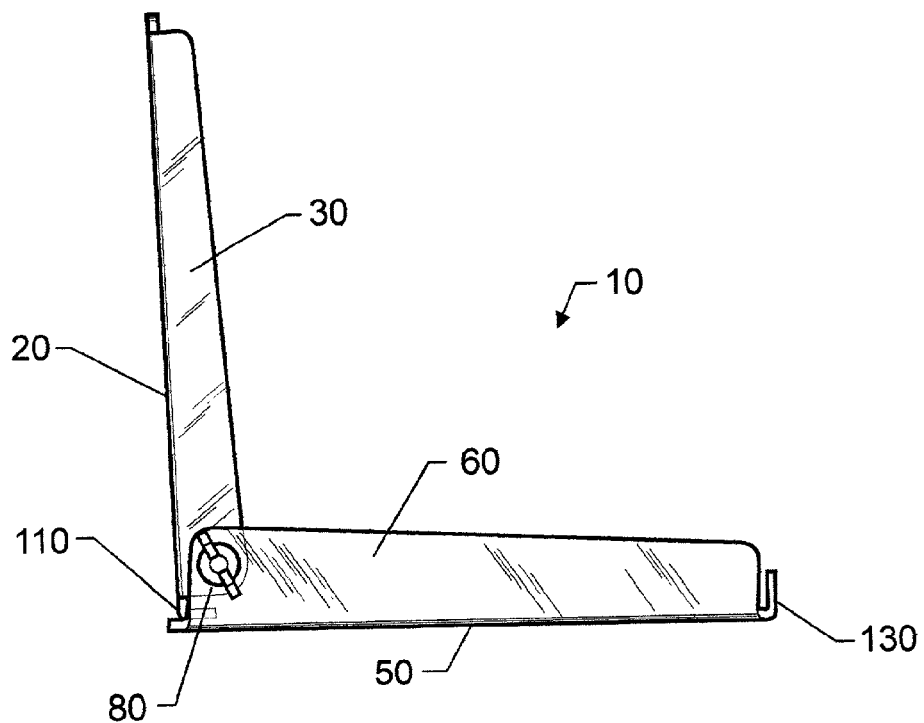
FIG. 5 is a left side elevation view of the invention in open position where the top plate member forms an angle with respect to the bottom plate member.

Referring to FIG. 2 and FIG. 5: In the open position, the top plate member 20 forms an angle with relationship to the bottom plate member 50. Preferably, the angle that the top plate member 20 forms with the bottom plate member 50 is approximately 90 degrees, i.e., vertical with respect to the bottom plate member when it is lying on a horizontal surface. Preferably this angle is slightly beyond vertical, and most preferably between 95 and 120 degrees with respect to the bottom plate member. This angle facilitates the ease of reading copy which is placed on the flange 110 of the top plate member 20. To facilitate the maintenance of this open position, the keyboard cover copy holder 10 may have a built in stop. The stop may be a function of the rear edge 120 or flange 110 of the top plate member 20 contacting the bottom pate member 50 or underlying surface in the open position. Likewise, the downward extending left and right side panels 30 and 40 may contact the bottom pate member 50 or underlying surface in the open position to maintain the angle of the open position to securely hold copy material.

Figure 8:
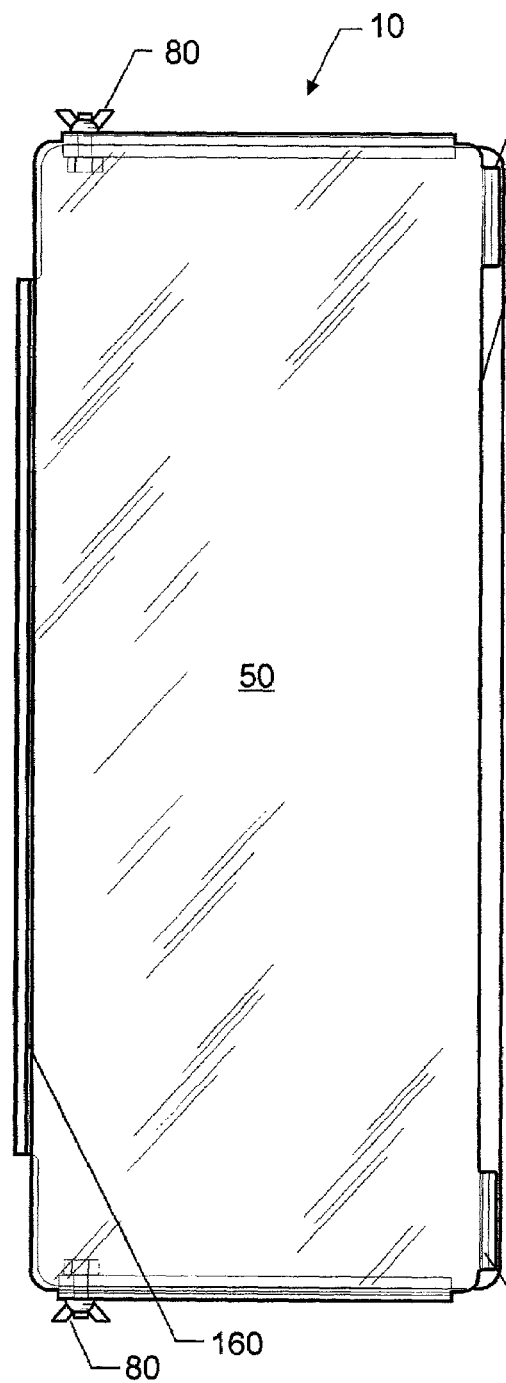
FIG. 8 is a bottom plan view of the invention in a closed position.
Figure 9:
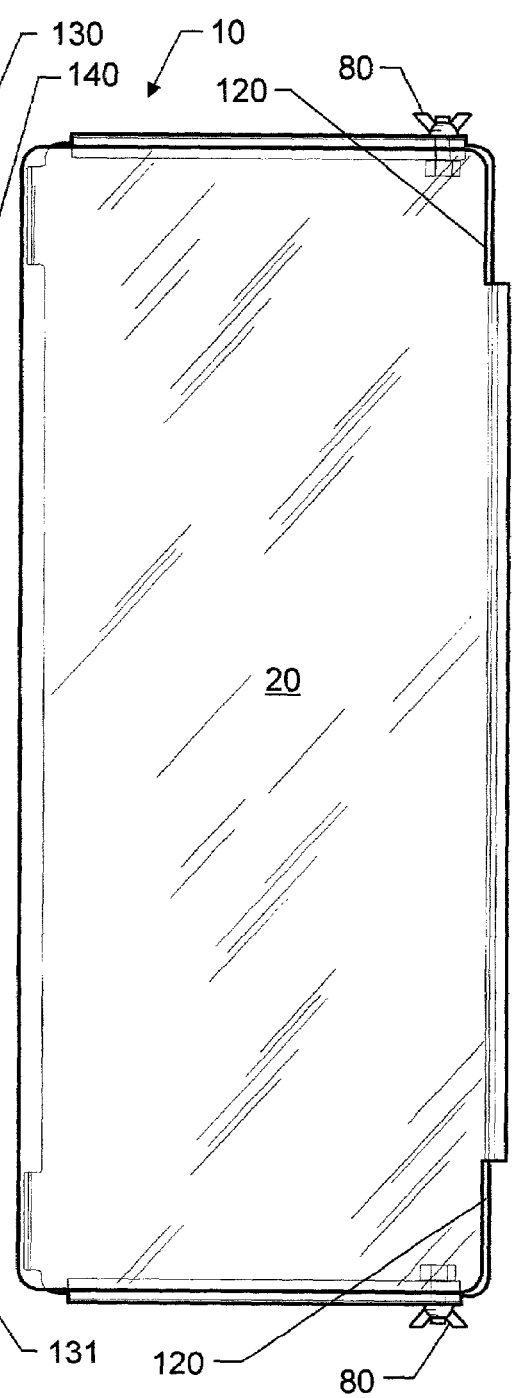
FIG. 9 is a top plan view of the invention in a closed position.

FIG. 6 is a front view of the keyboard cover copy holder 10 in a closed position. FIG. 7 is a back view of the keyboard cover copy holder 10 in a closed position. FIG. 8 depicts a closed position of the keyboard cover and copy-holder 10 wherein the bottom plate member 50 is revealed. FIG. 9 depicts a closed position of the keyboard cover and copy holder 10 wherein the top plate member 20 is revealed.

While the above description and the drawings disclose and illustrate one embodiment, one should understand, of course, that the invention is not limited to this embodiment. Those skilled in the art to which the invention pertains may make modifications and other embodiments employing the principles of this invention, particularly upon considering the foregoing teachings. Therefore, by the appended claims, the applicants intend to cover any modifications and other embodiments as incorporate those features which constitute the essential features of this invention.

What is claimed is:

1. A keyboard covering and copy holding apparatus comprising:
   a top plate member having downward extending left and right side panels and at least one flange extending downward from a back portion of said top plate member;
   wherein each downward extending left and right side panel has at least one bore disposed therein;
   a bottom plate member having upward extending left and right side panels and at least one flange extending upward from a front portion of said bottom plate member;
   wherein each upward extending left and right side panel has at least one bore disposed therein;
   wherein each downward extending left and right side panel is pivotably engaged with each respective upward extending left and right side panel with at least one fastener positioned in an operable relationship through each bore, such that said top plate member is rotatable with respect to said bottom plate member about a pivot axis passing through said upward extending left and right side panels of said bottom plate member and said downward extending left and right side panels of said top plate member;

and wherein said fastener comprises a wing nut, washer and bolt.

2. A keyboard cover and copy holder according to claim 1, wherein said top plate member and said bottom plate member are comprised of a polymeric material.

3. A keyboard cover and copy holder according to claim 1, wherein said bottom plate member is adapted to receive a computer keyboard thereon between said left and right side panels.

4. A keyboard cover and copy holder according to claim 1, wherein said top plate member is adapted to rotate about said pivot axis between a first closed position facing and substantially parallel to said bottom plate member, and a second open position substantially perpendicular to said bottom plate member.

5. A keyboard cover and copy holder apparatus according to claim 4, wherein said flange extending downward from a back portion of said top plate member is adapted to retain an item of printed material thereon when said top plate member is pivoted about said axis to said second open position.

6. A keyboard cover and copy holder comprising:
a polymeric top plate member having downward extending left and right side panels;
one flange extending downward from a rear portion of said top plate member;
at least one bore disposed within each downward extending left and right side panel;
a polymeric bottom plate member having upward extending left and right side panels;
said bottom plate member being adapted to receive a computer keyboard thereon between said left and right side panels;
at least one flange extending upward from a front portion of said bottom plate member;
at least one bore disposed within each upward extending left and right side panels; and
at least one fastener positioned in an operable relationship to each bore for pivotably engaging said top plate member to said bottom plate member for relative rotation on a pivot axis between a substantially parallel configuration and an angled configuration of said top plate member and said bottom plate member;
wherein said fastener comprises a wing nut, washer and bolt.

* * * * *